United States Patent [19]
Moore

[11] Patent Number: 5,680,839
[45] Date of Patent: Oct. 28, 1997

[54] APPARATUS AND METHOD OF DELIVERING A FUEL AND AIR MIXTURE FOR INTERNAL COMBUSTION ENGINES

[75] Inventor: Jesse C. Moore, Celina, Ohio

[73] Assignee: J. C. Moore Research, Inc., Celina, Ohio

[21] Appl. No.: 677,606

[22] Filed: Jul. 8, 1996

[51] Int. Cl.$^6$ ................................................ F02B 75/18
[52] U.S. Cl. ...................................... 123/184.58; 123/545
[58] Field of Search ........................ 123/184.38, 184.58, 123/590, 543, 545, 556

[56] References Cited

U.S. PATENT DOCUMENTS

| | | | |
|---|---|---|---|
| 1,676,955 | 7/1928 | Kemp | 123/545 |
| 2,232,413 | 2/1941 | Steskal | 123/545 |
| 2,698,613 | 1/1955 | Jagersberger | 123/545 |
| 2,767,699 | 10/1956 | Engstrom | 123/545 |
| 2,808,041 | 10/1957 | Dolza | 123/545 |
| 3,636,935 | 1/1972 | Martens . | |
| 4,086,891 | 5/1978 | Isawa . | |
| 4,108,124 | 8/1978 | Nakagawa . | |
| 4,211,191 | 7/1980 | Kawamura . | |
| 4,327,675 | 5/1982 | Takeda . | |
| 4,548,183 | 10/1985 | Hayashi . | |
| 4,848,281 | 7/1989 | McCord | 123/184.58 |
| 4,884,534 | 12/1989 | Moore . | |

Primary Examiner—Marguerite McMahon
Attorney, Agent, or Firm—Baker & Daniels

[57] ABSTRACT

The present invention involves an apparatus for the induction of a fuel and air mixture into the combustion chambers of a multi-cylinder internal combustion engine. A partition divides a manifold into a first and second portion. The first manifold portion provides a similar quantity and composition of fuel and air to each cylinder's intake port cavity at any single moment. The fuel and air mixture contained within the intake port cavities which does not enter the combustion chambers flows into the second manifold portion along with any hot residual exhaust gases escaping from the combustion chamber. A fluid pump continuously recirculates the fluid mixture from the second manifold portion into the first manifold portion and the hot residual gases are thoroughly intermixed thereby increasing engine performance. Hot deflector surfaces are located in the first manifold portion and transfer heat to the fuel and air mixture increasing the percentage of vaporized fuel. The fuel injectors are removed from the intense heat produced by operation of the engine and inject fuel into a high velocity discharge stream of the fluid pump, thereby sharply reducing the amount of fuel residue deposited upon the injector nozzles. Additionally, a movable deflector plate is utilized to increase the velocity of the intake air at low engine speeds.

23 Claims, 5 Drawing Sheets

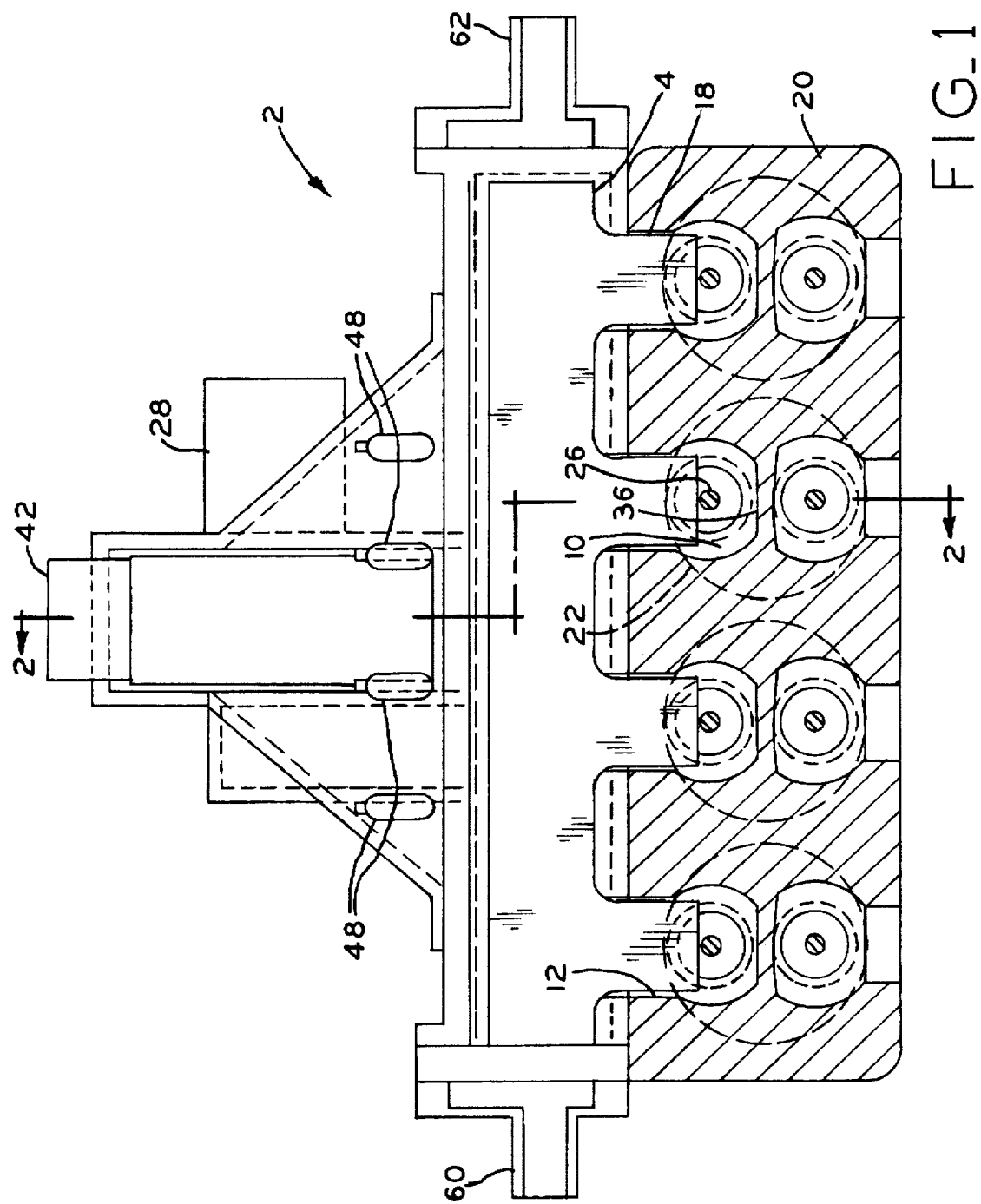
FIG_1

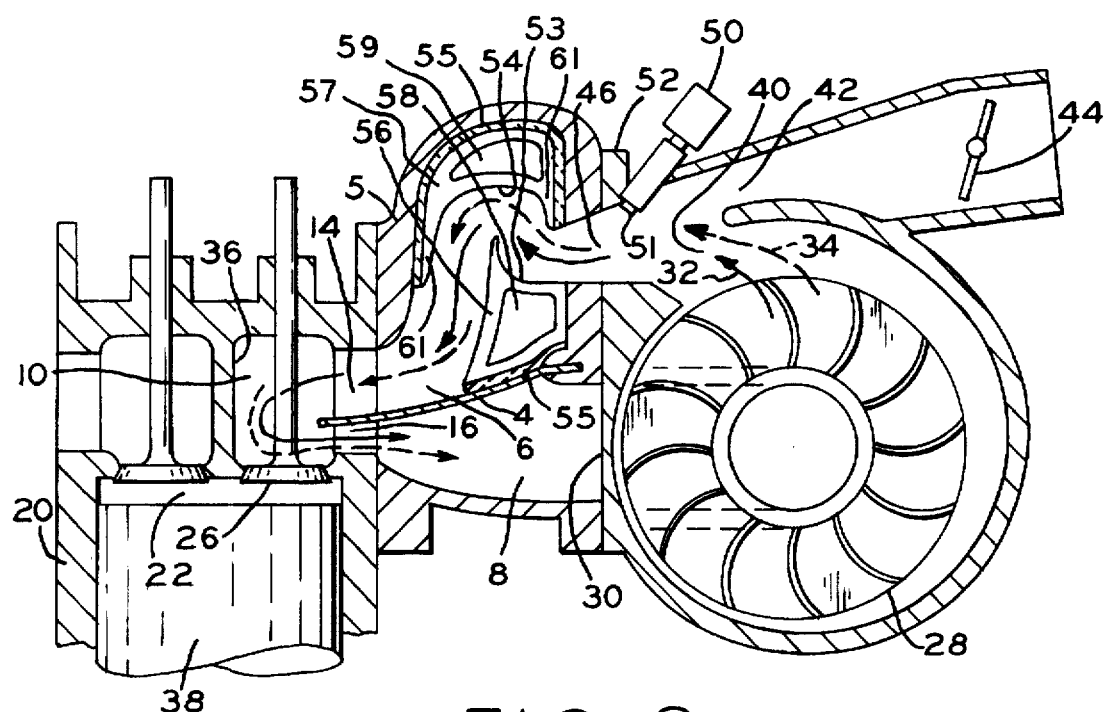
FIG_2
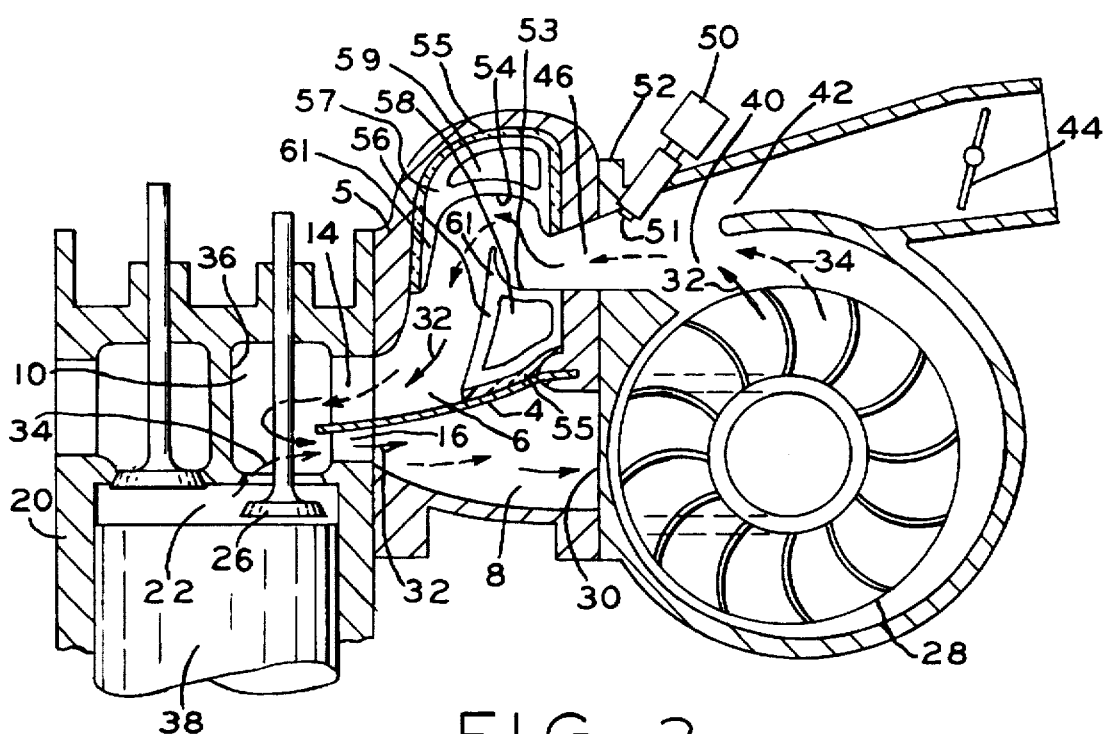
FIG_3

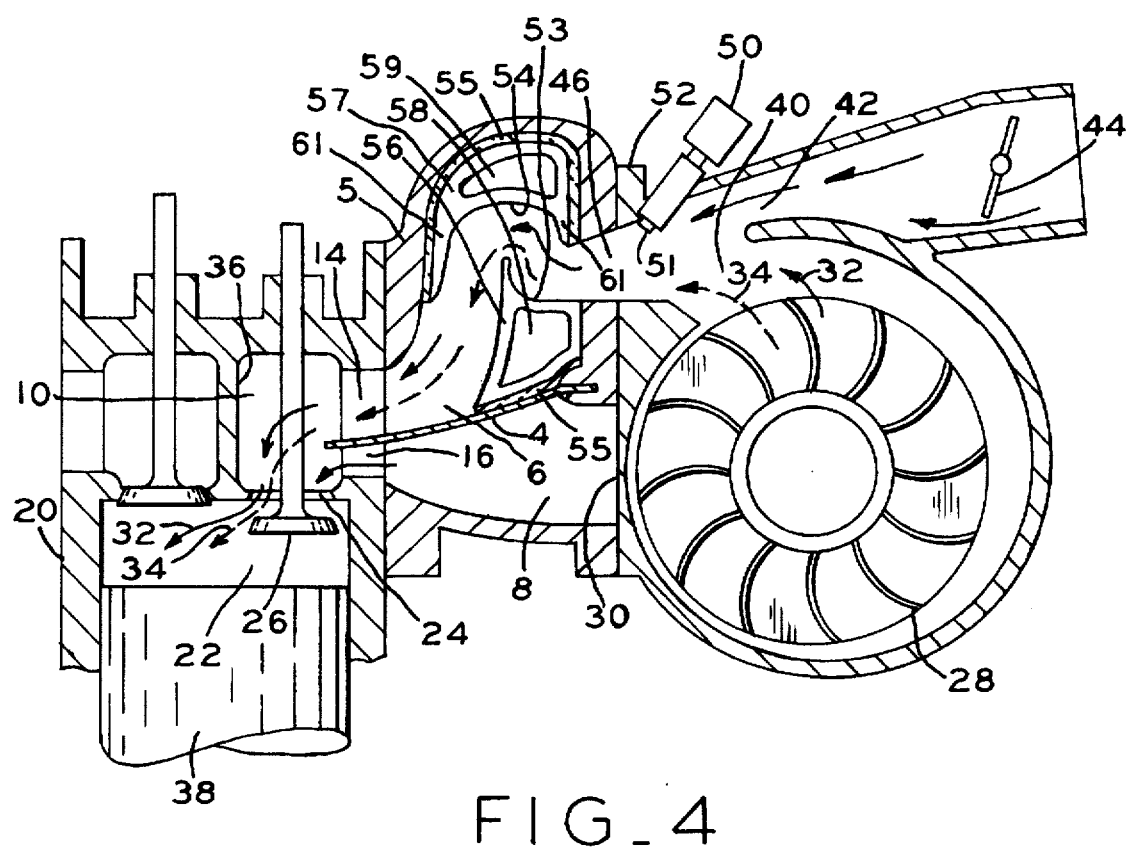
FIG_4

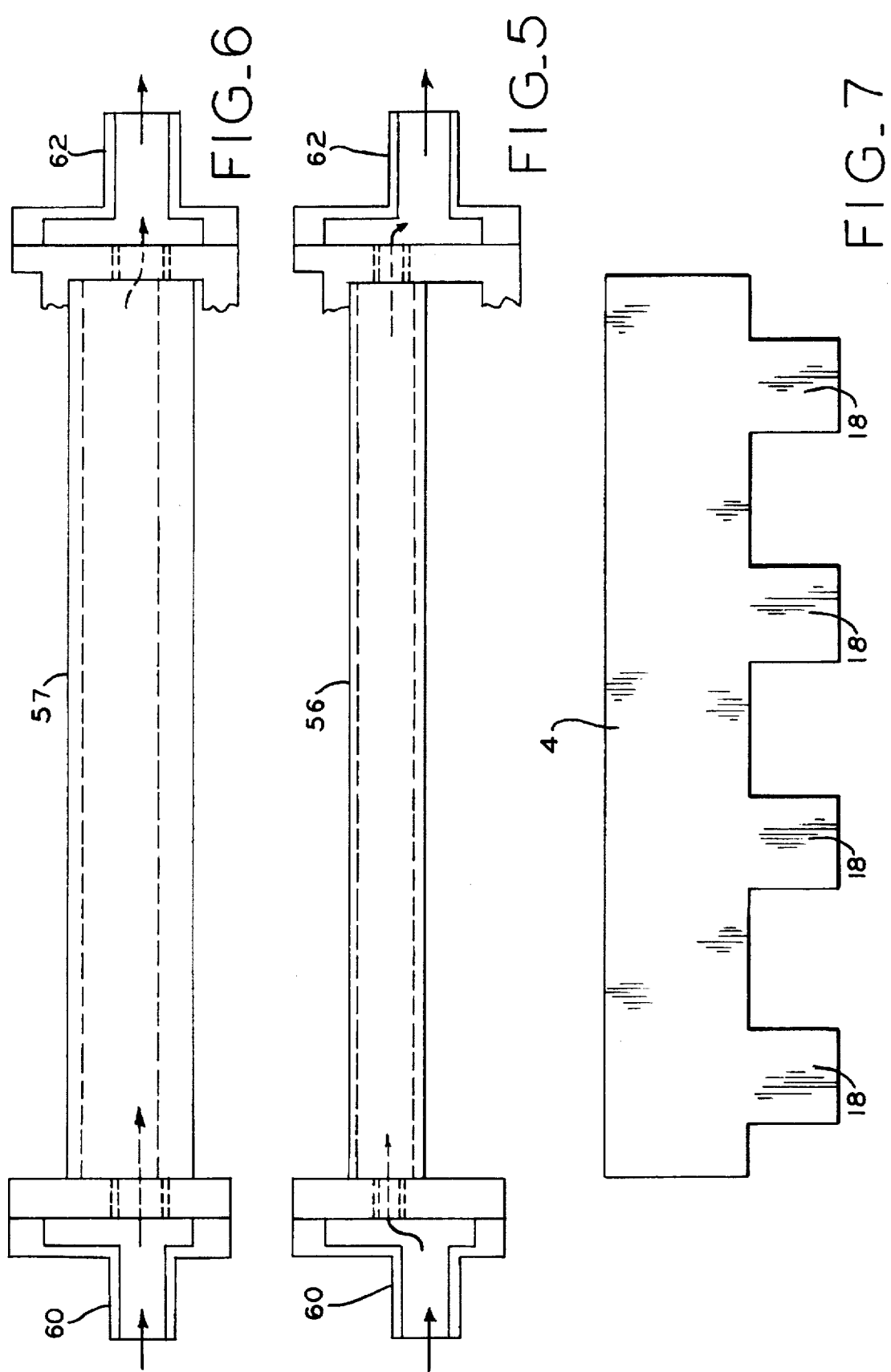

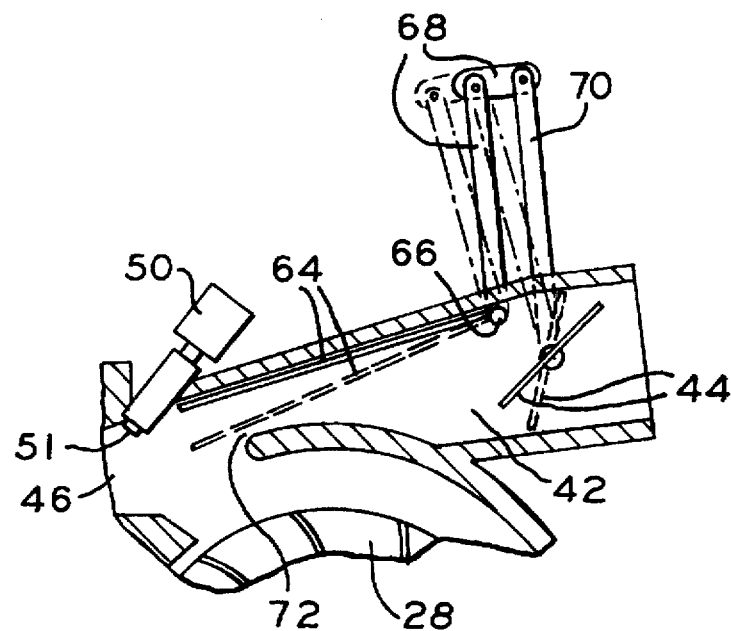
FIG_8
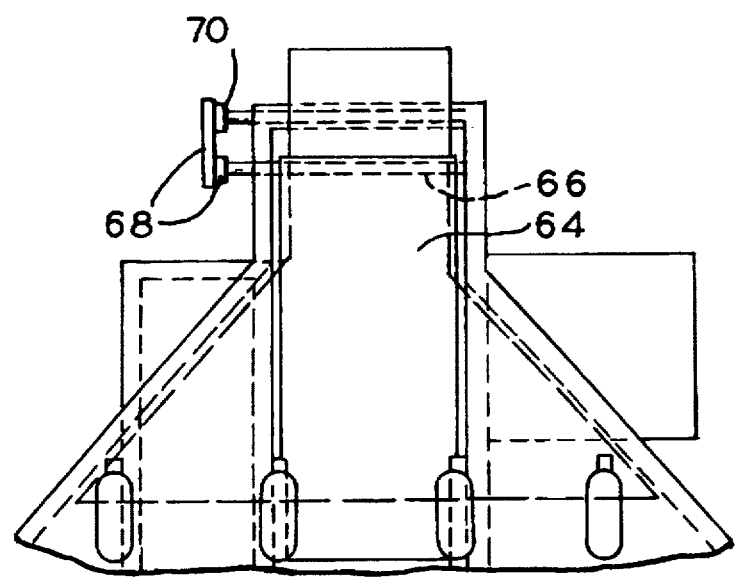
FIG_9

APPARATUS AND METHOD OF DELIVERING A FUEL AND AIR MIXTURE FOR INTERNAL COMBUSTION ENGINES

BACKGROUND OF THE INVENTION

1. Field of the Invention.

The present invention involves multi-cylinder internal combustion engines. More specifically, the present invention relates to the delivery of a fuel and air mixture to the combustion chambers of such engines.

2. Description of the Related Art.

One deficiency of multi-cylinder internal combustion engines of the spark ignition type is that the quantity of fuel delivered to all of the cylinders or combustion chambers at any given time is not precisely equal. This results in an imbalance in the power output of the combustion chambers of the engine. Also, when the intake cycle begins, the pressure in the cylinder or combustion chamber exceeds atmospheric pressure. At this same time, the pressure within the entire intake manifold area is below atmospheric pressure. Thus, a momentary back-flow occurs, causing hot residual exhaust gases to flow from the combustion chamber into the intake port areas. These hot exhaust gases are not capable of producing power and decrease the operational efficiency of the engine.

An electronic throttle body induction (i.e., TBI) system, as disclosed in U.S. Pat. No. 4,884,534 to Moore, assigned to the assignee of the present invention, the disclosure of which is explicitly incorporated by reference, reveals one method for correcting this problem. The TBI system utilizes a first and second manifold, wherein the first and second manifold are in fluid communication with all of the combustion chambers of the engine.

The TBI system utilizes an electronic injector for providing a fuel and air mixture for introduction into the first manifold for a multi-cylinder engine under atmospheric conditions. This first manifold provides, at any given time, a fuel and air mixture of the same quantity and composition to all of the combustion chambers via an intermediate conduit and an intake port region, thereby increasing efficiency.

The second manifold is in communication with the intake port region for each of the combustion chambers via a second intermediate conduit. A fluid pump is in communication with the second manifold and operates to circulate the fuel and air mixture between the first and second manifold.

Thus, in the above described arrangement, a fuel and air mixture enters the first manifold and travels to the intake ports of the combustion chambers. Each of the combustion chambers has an intake valve which opens and closes in the conventional manner. When an intake valve of a combustion chamber is closed, all of the fluid in the intake port region flows from the intake port region through the conduit member into the second manifold and to the fluid pump. The fluid is then forced by the fluid pump into the first manifold for flow to all of the intake port regions.

The fluid mixture continues to circulate and re-circulate as the fluid mixture flows from one manifold to the other manifold, as movement of the fluid is induced by the fluid pump. As an intake valve opens in one of the combustion chambers, a portion of the fluid mixture flows into the combustion chamber and the remaining portions of the fluid mixture continue to circulate in the manifolds.

At the beginning of the intake cycle, the intake valve begins to open. At this moment the pressure in the combustion chamber is slightly above atmospheric pressure. The entire manifold area at this moment has a pressure below atmospheric pressure. Therefore, at this moment hot residual exhaust gases flow from the combustion chamber and into the intake port area. These hot exhaust gases are drawn by the fluid pump and flow into the second manifold for mixing with the fuel and air and for circulation in the manifolds. During circulation and recirculation, the fuel and air mixture is deflected by the hot wall surfaces of the intake port region which helps to vaporize the fuel. The intermixture of hot residual exhaust gases also greatly helps to vaporize the fuel.

Another system currently used for providing a fuel and air mixture involves a throttled air intake with multiple fuel injectors placed in the constant-vacuum area of the intake system. One problem with these multiple-nozzle injection systems is that the injectors are placed in areas of excessive heat gain. This practice leads to the gradual build-up of a fuel residue on the injector nozzles, necessitating the periodic use of a chemical nozzle cleaner which can be added in the fuel tank. The build-up of foreign matter on the injector nozzles of conventional systems occurs most rapidly immediately after the hot engine is shut down. The fuel which remains on the exterior and interior nozzle surfaces after the engine is shut down is "fried" in place by the engine heat.

Current systems also spray "wet" unvaporized fuel onto the valves and into the inlet ports of the combustion chambers. Fuel should be in a vaporous state before ignition occurs, and wet, unvaporized fuel does not burn efficiently.

SUMMARY OF THE INVENTION

The present invention provides a fuel and air induction system with partition plate creating a double-level manifold, fuel injectors disposed in an area which is removed from the sources of excessive engine heat, a movable deflector plate located within the air intake port upstream of the fuel injectors and heated deflector surfaces within the manifold for increasing the percentage of vaporized fuel which improves the performance of multi-cylinder internal combustion engines by providing enhanced fuel vaporization and more thorough intermixing of the hot residual exhaust gases with the air and fuel mixture.

An advantage of the present invention is that the partition plate and manifold configuration produce a greater intermixture of the hot residual exhaust gases with the fuel and air mixture. This greater intermixture of the hot gases provides a homogenous fuel and air mixture and greater fuel vaporization. During low running speeds the increased intermixture is especially important due to a higher percentage of non-combustible hot residual gases present at that time. Thus, the greater intermixture leads to not only improved performance but also reduced emissions thereby reducing the load upon emission control systems such as catalytic converters.

Another advantage is that by directing the fuel and air mixture onto heated deflectors a very high percentage of the fuel is vaporized. The increased fuel vaporization and intermixture of hot residual gases increases the fuel efficiency of the engine, improves the engine performance during start-up, when idling, at low speeds, and during acceleration, it also results in cleaner intake manifolds, combustion chambers and engine oil.

Yet another advantage is that the fluid pump not only provides for the intermixture of hot residual gases but also produces a super-charger like effect. Although the fluid pump does not super-charge the engine, it does increase the quantity of combustible air and fuel mixture received into the combustion chamber during the intake stroke while using far less energy than a conventional super-charger.

Still another advantage of the present invention is that by removing the fuel injectors from the sources of excessive engine heat there is no significant build-up of fuel residue upon the injector nozzles. This placement also allows the fuel to be injected into a high velocity air stream which is under full engine vacuum (i.e., the vacuum created within the manifold by operation of the engine) aiding the vaporization process, and allows the possible number of fuel injection nozzles to be less than the number of cylinders.

An additional advantage of the present invention is that by locating a movable deflector plate upstream of the fuel injectors in the air intake port, the movable deflector plate may be used to "pinch" the intake air flow at slow engine speeds when the intake volume is low. The movable deflector plate thereby increases the velocity of the intake air flow as it passes the fuel injectors and, thus, promotes the vaporization of the fuel and intermixture of the fluids present in the manifold.

The invention comprises, in one form thereof, a thin partition to create a double-level manifold. A fluid pump is used to circulate and re-circulate the air and fuel mixture and intermix hot residual gases with the fuel and air mixture within the two manifold portions. A plurality of fuel injectors are removed from the excessively heated areas and inject fuel into a full engine vacuum created near a high velocity discharge stream of the fluid pump at a point of constricted passage or "pinch" area of the first manifold portion. A movable deflector plate may be installed upstream of the fuel injectors to further, and variably, "pinch" the intake air stream to increase the velocity of the fluid stream adjacent the fuel injectors. The number of fuel injectors which are used is based in part upon the number of cylinders, spacing and capacity constraints and preferably varies from 2 to 6 in a four cylinder engine.

The fluid pump discharge directs the fuel and air mixture into contact with hot deflectors which extend from and conduct heat from conduits transporting hot engine coolant system fluid in the first manifold portion. The fuel and air mixture then strikes the partition plate and is shunted into the hot inlet port cavities. Next, the mixture enters the combustion chamber if the combustion chamber is undergoing an intake stroke, otherwise the mixture is directed into the second manifold portion and is intermixed with the fuel and air mixture and hot exhaust gases from each of the other inlet port cavities. The contents of the second manifold portion are then further intermixed and re-circulated by the fluid pump which is in communication with both the first and second manifold portion.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a partial plan view of an engine which shows a fuel and air induction system according to the present invention.

FIG. 2 is a sectional view of the engine taken along line 2—2 of FIG. 1 showing one of the intake valves in a closed position.

FIG. 3 is a sectional view, similar to FIG. 2. This view shows the intake valve of FIG. 2 in an open position near the beginning of an intake stroke within the combustion chamber and the "backflow" of hot residual gases.

FIG. 4 is a sectional view, similar to FIG. 2. This view shows the intake valve of FIG. 2 in an open position with "inflow" underway during an intake stroke within the combustion chamber.

FIG. 5 is a side view, in partial cross-section, of the first deflector.

FIG. 6 is a side view, in partial cross-section, of the second deflector.

FIG. 7 is a plan view of the partition.

FIG. 8 is a partial sectional view of an engine which shows a movable deflector plate located in the air intake port.

FIG. 9 is a partial plan view showing the movable deflector plate.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates one preferred embodiment of the invention, in one form, and such exemplification is not to be construed as limiting the scope of the invention in any manner.

DETAILED DESCRIPTION OF THE INVENTION

The embodiment disclosed below is not intended to be exhaustive or limit the invention to the precise form disclosed in the following detailed description. Rather, the embodiment is chosen and described so that others skilled in the art may utilize its teachings.

Referring now to the drawings and particularly to FIGS. 1–4, there is shown an engine 2, in which there is a manifold partition 4. Partition 4 separates a single larger manifold, enclosed by manifold housing 5, into first manifold portion 6 and second manifold portion 8, as seen in FIG. 2. A manifold aperture 12 is divided into a first opening 14 and a second opening 16 by a partition flap 18 thereby allowing a fuel and air mixture 32 and hot residual exhaust gases 34 to flow from the first manifold portion 6 into each of the intake port cavities 10 via first opening 14. Each intake port cavity 10 is defined by the cylinder block 20 and is in fluid communication with the combustion chamber 22 via the intake port 24 when the intake valve 26 is in an open position as shown in FIGS. 3 and 4.

FIG. 2 shows the combustion chamber 22 at a moment in which the intake port 24 is closed by the intake valve 26. The air and fuel mixture 32 and hot residual exhaust gases 34 which enter the intake port cavity 10 are deflected by the walls 36 of the cavity 10 which are heated by the operation of the engine 2. Thus, the hot wall surfaces 36 help to vaporize the fuel in the air and fuel mixture 32. The intermixture of hot residual exhaust gases 34 and air and fuel mixture 32 within the intake port cavity 10 then flow, via the second opening 16 into the second manifold portion 8 which is in fluid communication with each of the intake port cavities 10.

FIG. 3 shows the combustion chamber 22 at a moment in which a piston 38 has completed its exhaust stroke and the intake stroke has begun. The intake valve 26 has moved and thereby opened the intake port 24. Because the pressure within the combustion chamber 22 exceeds the pressure of the intake port cavity 10 at this time, hot residual exhaust gases 34 enter the intake port cavity 10 from the combustion chamber 22 creating a "backflow". The intermixture of fluids within the intake port cavity 10 then flows into the second manifold portion 8 via the second opening 16.

FIG. 4 shows the combustion chamber 22 at a moment in which the piston 38 is moving away from the intake port 24 and an "inflow" intake stroke is underway. The intake valve 26 has moved into a fully open position to allow the fuel and air mixture 32 to enter the combustion chamber 22 through the intake port 24. Because the first manifold portion 6 is in fluid communication with each of the port intake cavities 10 the quantity and composition of the fuel and air mixture 32 is the same in each of the intake port cavities 10 at the moment an intake stroke occurs in any one of the combustion chambers 22.

The intermixture which enters the second manifold portion 8 via the second opening 16 is further intermixed within the second manifold 8 before it is drawn into the fluid pump 28 through the fluid pump inlet 30. The action of the fluid pump 28 continues the intermixing of the fuel and air mixture 32 and the hot residual exhaust gases 34 and produces a discharge flow consisting of the resultant intermixture. The discharge flow originates at a fluid pump discharge passage 40. The fluid pump 28 provides the driving force for the circulation and recirculation of the fuel and air mixture 32 and hot residual gases 34 within and between the first manifold portion 6 and second manifold portion 8. The fluid pump 28 is activated as the engine is being started and operates continuously while the engine is running. The fluid pump discharge passage 40 is an extension of the first manifold portion 6 and has its outer limits defined by a second manifold housing 52. An air intake port 42 is in communication with the fluid pump discharge passage 40 and the entry of additional air through the air intake port 42 is controlled by a pivotally mounted throttle plate 44.

The contents of the fluid pump discharge passage 40 then enter a constricted passage 46 due to the forces generated by the fluid pump 28. Due to the smaller cross-sectional area of the constricted passage 46, the velocity of the fluid increases. It is at this constricted passage 46 that the fuel injection ports 51 are located and the fuel injectors 50 inject fuel into the area containing an intermixture of fluids circulating at high velocity. The high velocity of the intermixture of fluids in the constricted passage 46 not only helps to vaporize the injected fuel but also intermixes the hot residual gases with the other fluids present in the constricted passage 46.

By placing the fuel injectors 50 at a location which is removed from the excessive heat generated within the port intake cavities 10 the fuel residue deposited upon the fuel injector nozzle 51 is reduced, as, for example, when a hot engine is "shut-off". (Although the fuel injectors 50 illustrated in the drawings constitute one means for introducing a fuel and air mixture into the first manifold portion, a TBI or carburetor may also be used.)

Locating the fuel injectors 50 at a point where the velocity of the fluid is relatively high helps to vaporize and intermix the injected fuel into the circulating fluid mixture. It is also possible to use a movable deflector plate 64 as shown in FIGS. 8 and 9 to further, and variably, increase the velocity of the fluid stream into which the fuel is injected. As can be seen in FIG. 8, deflector plate 64 is pivotally mounted with hinge 66 at its end adjacent the throttle plate 44. A linkage 68 is connected to the throttle plate control arm 70 and moves deflector plate 64 in cooperation with the throttle plate 44. The deflector plate 64 does not throttle the intake air, rather it variably "pinches" the intake air to control the velocity of the intake air.

The shape of the deflector plate 64 in plan view is determined by the configuration of the engine. In the illustrated embodiment the deflector plate 64 is fan shaped as can be seen in FIG. 9. The deflector plate 64 may also have ribs, not shown, to increase the rigidity and strength of the deflector plate.

The velocity of the intake air, as it passes fuel injector 50 through restricted passage 46, is typically reduced during low engine speeds because the throttle plate 44 allows only a limited volume of intake air to enter the air intake port 42 at low engine speeds. Conversely, the velocity of intake air is increased at higher engine speeds because throttle plate 44 allows a larger volume of intake air to enter the restricted passage 46. Movable deflector plate 64 is linked to throttle plate 44 to "pinch" the intake air when the throttle plate 44 is allowing only a limited volume of intake air to enter the engine and thereby increase the velocity of the intake air during low engine speeds. As can be seen by the solid lines in FIG. 8, deflector plate 64 does not restrict the area of air intake port 42 when throttle plate 44 is allowing a relatively large volume of intake air to enter air intake port 42. However, when throttle plate 44 is positioned to allow only a small volume of intake air to enter air intake port 42, as shown in dashed outline in FIG. 8, the movable deflector plate 64 is positioned to restrict the area of the air intake port 42, leaving only a small gap 72, and thereby increase the velocity of the intake air, i.e., "pinch" the intake air. Gap 72 is, thus, reduced as throttle plate 44 is moved to positions in which the volume of intake air allowed to enter the intake port 42 is decreased.

By utilizing a deflector plate 64 to increase the velocity of the intake air as it exits the air intake port 42 during low engine speeds, the velocity and turbulence of the fluid stream present in restricted passage 46 is increased during low engine speeds. The increased velocity and turbulence of the fluid stream in restricted passage 46 helps to vaporize and intermix the fluid which is injected by fuel injector 50 into restricted passage 46. The vaporization of the injected fuel may be further improved by locating a heat exchanger prior to the throttle plate 44 to pre-heat the intake air.

The turbulent flow of fuel and air 32 is then directed against a hot first deflector surface 53 which is thermally coupled with a first deflector conduit 56 and which defines a first passageway 58. The first passageway 58 transports hot engine coolant system fluids between an inlet engine coolant system conduit 60 and an outlet engine coolant system conduit 62. The first deflector surface 53 transfers thermal energy from the hot engine coolant system fluids to the intermixture of fluids thereby increasing the percentage of vaporized fuel. Similarly, a second deflector conduit 57 has a second passageway 59 for transporting hot engine coolant system fluids and a second deflector surface 54. The deflector conduits 56 and 57 are preferably constructed of copper, however, they may also be constructed of other metals or plastic. Insulation 55 may be placed between the deflector conduits 56 and 57 and the manifold housing 5, but insulation 55 is not required. As shown in FIGS. 2–4, the first deflector surface 53 is shaped to direct the flow of fluids into contact with a second deflector surface 54 which also transfers heat to the intermixture of fluids. The first and second conduits 53 and 54 utilize fin-like extensions 61 to direct the flow of fluids and which also increase the surface area of the deflector surfaces 53 and 54. The deflector surfaces 53 and 54 create additional turbulence which further intermixes the gases and fluids present in the first manifold portion 46. FIGS. 5 and 6 show how the deflector conduits 56 and 57 transport hot engine coolant system fluids between the inlet coolant system conduit 60 and the outlet engine coolant system conduit 62.

The air and fuel mixture 32 is directed by the deflector surfaces 54 onto the partition 4. Thin, generally planar, i.e flat, partition 4, which is preferably constructed of metal, then shunts the intermixture of fluids into each of the intake port cavities 10. The fuel and air mixture 32 and hot residual gases 34 is further homogenized by striking the partition 4. Absorbing additional heat from partition 4 further vaporizes the fuel. The repeated intermixing and resultant homogenization of the fuel and air mixture 32 and hot residual gases 34 breaks up concentrations of the non-combustible "backflow" gases. The vaporized, homogenous intermixture created by the repeated heating and intermixing enables the engine 2 to run more efficiently and cleaner.

Upon entry into the intake port cavity 10 the intermixture is further intermixed and absorbs additional heat from the walls 36 of the intake port cavity 10. The contents of the intake port cavities 10 which do not enter the combustion chambers 22 are transported to the second manifold portion 8 where they are recirculated by the fluid pump 28.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluid induction apparatus for an internal combustion engine having a plurality of combustion chambers, each of the combustion chambers having a piston, an intake port and an intake valve, the intake valve being operable to open and close the intake port, the intake port providing fluid communication with an intake port cavity when the valve is in an open position, said fluid induction apparatus comprising:

a housing having an interior surface defining a manifold;
    at least one port positioned to introduce air and fuel into said manifold;
    a fluid pump for circulating fluids within said manifold;
    a conduit defining a passageway for transporting engine coolant system fluids and having a fin extending therefrom, said conduit located within said manifold; and
    a deflector surface defining an exterior surface of said conduit and said fin; said deflector surface being thermally coupled to said conduit and said fin; said deflector surface being located in said manifold and positioned to contact and direct a fuel and air mixture within said manifold,
    whereby thermal energy from the engine coolant system fluids is imparted to the fuel and air mixture before the fuel and air mixture is shunted into the intake port cavities.

2. The fluid induction apparatus of claim 1 further comprising a thermal insulating material disposed between said conduit and said housing.

3. The fluid induction apparatus of claim 1 further comprising:

a second conduit defining a second passageway for transporting engine coolant system fluids and having a fin extending therefrom, said second conduit located within said manifold;
    a second deflector surface defining an exterior surface of said second conduit and said second fin; said second deflector surface being thermally coupled to said second conduit, said deflector surface being located within said manifold and positioned to contact and direct the fuel and air mixture within said manifold;
    whereby thermal energy from the engine coolant system fluids is imparted to the fuel and air mixture by said deflector surfaces before the fuel and air mixture is shunted into the intake port cavities.

4. A fluid induction apparatus for an internal combustion engine having a plurality of combustion chambers, each of the combustion chambers having a piston, an intake port and an intake valve, the intake valve being operable to open and close the intake port, the intake port providing fluid communication with an intake port cavity when the valve is in an open position, the intake port cavity being formed by walls of the engine block which are heated by operation of the engine, said fluid induction apparatus comprising:

a housing having an interior surface defining a manifold, said manifold being in fluid communication with each of the intake port cavities;
    a thin, substantially flat partition plate dividing said manifold into a first and second manifold portion and defining a plurality of first openings providing fluid communication between each of said intake port cavities and said first manifold portion and a plurality of second openings providing fluid communication between each of said intake port cavities and said second manifold portion;
    a fluid pump for continuously circulating fluids from said second manifold portion into said first manifold portion; and
    a means for introducing fuel and air into said first manifold portion;
    whereby a fuel and air mixture is introduced into said first manifold portion and shunted by said partition into each of the intake port cavities through said first openings, the fuel and air mixture entering said second manifold portion through said second openings when the intake valve is not in the open position, the fuel and air mixture flowing into one of the combustion chambers when the intake valve is in the open position and the piston is moving away from the intake port, hot residual gases entering the intake port cavity when the valve is in the open position and the piston is beginning an intake stroke, the hot residual gases and the fuel and air mixture then entering said second manifold portion through said second opening, the fuel and air mixture and hot residual gases forming an intermixture in the inlet port cavities and said second manifold portion, the intermixture being further homogenized when said intermixture enters the fluid pump from said second manifold portion and is recirculated into said first manifold portion.

5. The fluid induction apparatus of claim 4 wherein said thin, substantially flat partition plate further comprises a plurality of thin, substantially flat flaps, each of said flaps extending into one of said intake port cavities whereby said plurality of flaps defines a partition between said plurality of first openings and said plurality of second openings.

6. The fluid induction apparatus of claim 4 further comprising:

a conduit defining a passageway for transporting engine coolant system fluids; and a deflector surface thermally coupled to said conduit and positioned to contact and direct the fuel and air mixture within said first manifold portion, whereby thermal energy from the engine coolant system fluids is imparted to the fuel and air mixture.

7. The fluid induction apparatus of claim 4 wherein said housing has an air induction port and at least one fuel injection port, said housing defining an extension of said first manifold portion; said extension providing fluid communication for a discharge flow from said fluid pump to said first manifold portion; and a fuel injector positioned to introduce fuel into said discharge flow through said fuel injection port; said fuel injection port being disposed in said extension.

8. The fluid induction apparatus of claim 7 wherein said extension defines a constricted passage and said fuel injector introduces fuel into said extension at said constricted passage.

9. The fluid induction apparatus of claim 4 wherein said housing has an air induction port and at least one fuel injection port, said housing defining an extension of said first manifold portion; said extension providing fluid communication for a discharge flow from said fluid pump to said first manifold portion; and a plurality of fuel injectors which introduce fuel into said discharge flow, said plurality of fuel injectors being less in number than the plurality of combustion chambers.

10. The fluid induction apparatus of claim 9 wherein said extension defines a constricted passage and said plurality of fuel injectors introduce fuel into said discharge flow at said constricted passage.

11. The fluid induction apparatus of claim 4 further comprising:

a fuel injection port;

an air induction port; and a movable deflector plate disposed in said air induction port whereby said area of said air induction port may be adjusted.

12. The fluid induction apparatus of claim 11 wherein said means for introducing air into said first manifold portion comprises a throttle plate; said movable deflector plate being pivotally mounted at an edge adjacent said throttle plate; movement of said deflector plate being coordinated with movement of said throttle plate by a linkage assembly.

13. A fluid induction apparatus for an internal combustion engine having a plurality of combustion chambers, each of the combustion chambers having a piston, an intake port and an intake valve, the intake valve being operable to open and close the intake port, the intake port providing fluid communication with an intake port cavity when the valve is in an open position, said fluid induction apparatus comprising:

a housing defining a manifold and having an air induction port and a fuel injection port;

a fluid pump for circulating fluids within said manifold;

a block having an interior surface defining at least one aperture providing fluid communication between said manifold and the intake port cavities; and a fuel injector positioned to introduce fuel into said housing through said fuel injection port at a location on said housing substantially opposite said block;

whereby a fuel and air mixture is introduced into said manifold and shunted into each of the intake port cavities where the fuel and air mixture enters the combustion chambers when the intake valve is in the open position.

14. The fluid induction apparatus of claim 13 wherein said housing defines a constricted passage in said manifold and said fuel injector is positioned to introduce fuel into said housing at said constricted passage through said fuel injection port.

15. The fluid induction apparatus of claim 14 further comprising a plurality of fuel injectors positioned to introduce fuel into said constricted passage, said plurality of fuel injectors being less in number than the plurality of combustion chambers.

16. The fluid induction apparatus of claim 13 further comprising:

a conduit defining a passageway for transporting engine coolant system fluids; and a deflector surface thermally coupled to said conduit and positioned to contact and direct the fuel and air mixture within said manifold, whereby thermal energy from the engine coolant system fluids is imparted to the fuel and air mixture before the fuel and air mixture enters the intake port cavity.

17. The fluid induction apparatus of claim 13 further comprising:

a movable deflector plate disposed in said air induction port whereby said area of said air induction port may be adjusted.

18. A fluid induction apparatus for an internal combustion engine having a plurality of combustion chambers, each of the combustion chambers having a piston, an intake port and an intake valve, the intake valve being operable to open and close the intake port, the intake port providing fluid communication with an intake port cavity when the valve is in an open position, said fluid induction apparatus comprising:

a housing having an interior surface defining a manifold, said manifold defining a looped circulation path;

a fluid pump for circulating and recirculating fluids within said manifold; and a throttled air supply introduced into said housing through an air induction port;

at least one fuel injection port, said housing defining an extension of said manifold, said extension providing fluid communication for a discharge flow from said fluid pump to said manifold and defining said fuel injection port; and a fuel injector positioned to introduce fuel into said discharge flow within said extension through said fuel injection port at a location between said air induction port and the intake port cavities;

whereby a fuel and air mixture is introduced into said manifold and shunted into each of the intake port cavities and thereafter enters the combustion chambers when the intake valve is in the open position.

19. The fluid induction apparatus of claim 18 wherein said extension defines a constricted passage and said fuel injector is positioned to introduce fuel into said constricted passage through said fuel injection port.

20. The fluid induction apparatus of claim 19 wherein said fuel injector comprises a plurality of fuel injectors positioned to introduce fuel into said extension, said plurality of fuel injectors being less in number than the plurality of cylinders.

21. The fluid induction apparatus of claim 18 further comprising:

a conduit defining a passageway for transporting engine coolant system fluids; and a deflector surface thermally coupled to said conduit and positioned to contact and direct the fuel and air mixture within said manifold, whereby thermal energy from the engine coolant system fluids is imparted to the fuel and air mixture before the fuel and air mixture enters the intake port cavity.

22. The fluid induction apparatus of claim 18 further comprising:
a movable deflector plate disposed in said air induction port whereby said area of said air induction port may be adjusted.

23. The fluid induction apparatus of claim 22 wherein said throttled air supply is controlled by a throttle plate; said movable deflector plate is pivotally mounted at an edge adjacent said throttle plate and a linkage assembly coordinates movement of said deflector plate with movement of said throttle plate.

* * * * *